United States Patent
Shin

(10) Patent No.: US 9,579,984 B1
(45) Date of Patent: Feb. 28, 2017

(54) CONTROL METHOD OF LOW VOLTAGE DC-DC CONVERTER FOR HYBRID VEHICLE

(71) Applicant: Hyundai Motor Company, Seoul (KR)

(72) Inventor: Dong Jun Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/137,676

(22) Filed: Apr. 25, 2016

(30) Foreign Application Priority Data

Dec. 7, 2015 (KR) .......................... 10-2015-0173513

(51) Int. Cl.
   *B60L 11/10* (2006.01)
   *B60L 11/18* (2006.01)
   *B60L 7/12* (2006.01)

(52) U.S. Cl.
   CPC ............. *B60L 11/1811* (2013.01); *B60L 7/12* (2013.01); *B60L 11/1861* (2013.01); *B60W 20/13* (2016.01); *B60L 2210/10* (2013.01); *Y10S 903/904* (2013.01)

(58) Field of Classification Search
   CPC .... B60L 11/1811; B60L 7/12; B60L 11/1861; B60L 2210/10; B60W 20/13; Y10S 903/904
   See application file for complete search history.

(56) References Cited

U.S. PATENT DOCUMENTS

| 2011/0133694 A1* | 6/2011 | Song | B60L 1/14 320/109 |
| 2015/0306937 A1* | 10/2015 | Kitamura | B61D 27/00 701/36 |
| 2016/0001772 A1* | 1/2016 | Kato | B60L 11/123 701/22 |
| 2016/0121725 A1* | 5/2016 | Shin | B60L 7/16 701/22 |

FOREIGN PATENT DOCUMENTS

| JP | 2004-015847 A | 1/2004 |
| KR | 2009-0023716 A | 3/2009 |
| KR | 2014-0082227 A | 7/2014 |
| KR | 2015-0016809 A | 2/2015 |

\* cited by examiner

*Primary Examiner* — Richard Camby
(74) *Attorney, Agent, or Firm* — Mintz Levin Cohn Ferris Glovsky and Popeo, P.C.; Peter F. Corless

(57) ABSTRACT

A control method of a low voltage DC-DC converter for a hybrid vehicle is provided. The method includes determining a vehicle drive mode, determining vehicle driving condition, and determining vehicle condition information including a motor output alteration and a gear mode. Further, an output mode of the low voltage converter is determined based to the drive mode, the driving condition, and the condition information and an output voltage of the low voltage converter is adjusted based on temperature and SOC of a battery in the determined output mode.

20 Claims, 2 Drawing Sheets

CONTROL METHOD OF LOW VOLTAGE DC-DC CONVERTER FOR HYBRID VEHICLE

CROSS REFERENCE TO RELATED APPLICATION

The present application claims priority of Korean Patent Application No. 10-2015-0173513 filed on Dec. 7, 2015, the entire contents of which is incorporated herein for all purposes by this reference.

BACKGROUND

Field of the Invention

The present invention relates to a control method of a low voltage DC-DC converter for a hybrid vehicle that improves efficiency of a low voltage converter by varying application of output voltage of the low voltage converter based on drive modes and driving conditions of a hybrid vehicle.

Description of the Related Art

In general, a hybrid electric vehicle refers to a vehicle in which power sources are configured by an engine and a drive motor driven by power of a battery, and which promotes enhancement of fuel consumption with the assisting power of the motor driven by voltage of the battery when the vehicle is started or accelerated by combining the power sources to a front wheel.

In an electric vehicle, a controller configured to operate the vehicle includes a hybrid control unit (HCU) or a vehicle control unit (VCU). The HCU or VCU are configured to communicate with a motor control unit (MCU), which is a lower controller, by a predetermined type to adjust torque, speed, and generate torque amount of a motor as a power source, and communicate with an engine control unit (ECU), configured to adjust an engine generating power required for generating power as the assisted power source, to perform a relay control for engine starting and a failure diagnosis.

In addition, the HCU is configured to communicate with a battery management system (BMS) configured to manage the battery by detecting temperature, voltage, current, state of charge (SOC), and so on, of the battery to adjust torque and speed of the motor based on conditions of SOC, and communicate with a transmission control unit (TCU) configured to adjust gear ratio based on a vehicle speed and a drive command of a driver to maintain a vehicle speed required by the driver. The communication between the HCU as the higher controller and the lower controllers is performed by a controller area network (CAN) bus to exchange information with each other and transmit/receive control signals.

Meanwhile, the electric vehicle includes a low voltage DC/DC converter (LDC), this is, DC-DC converter configured to convert electric power of a high voltage battery to direct current (DC). The LDC is configured to convert DC to alternating current (AC), increase or decrease voltage using a coil, a trance, a capacitance, and so on, and then, generate DC to supply electricity that corresponds to voltage used in each electric field load.

For controlling the low voltage converter (LDC), many technologies have been developed. For example, a technology in the related art involves a method for improving output efficiency by turning off the LDC as a voltage drop device when high output is required in a vehicle. However, this technology merely controls on/off of the low voltage converter based on a vehicle condition, and does not adjust output voltage of the low voltage converter when the low voltage converter is on to improve efficiency of the low voltage converter.

The foregoing is intended merely to aid in the understanding of the background of the present invention, and is not intended to mean that the present invention falls within the purview of the related art that is already known to those skilled in the art.

SUMMARY

The present invention provides a control method of a low voltage DC-DC converter for a hybrid vehicle having advantages of improving output voltage efficiency of the low voltage converter by varying the application of output voltage of a low voltage converter for a hybrid vehicle based on drive modes and driving conditions of a hybrid vehicle, and including a determining logic applying hysteresis thereto when determining conditions information of a vehicle.

A control method of a low voltage DC-DC converter for a hybrid vehicle according to the present invention may include: determining a vehicle drive mode by a controller of a low voltage converter; determining vehicle driving condition by the controller; determining vehicle condition information including a motor output alteration and a gear mode by the controller; determining an output mode of the low voltage converter based on the drive mode, the driving condition, and the condition information by the controller; and adjusting an output voltage of the low voltage converter based on temperature and SOC of a battery by the controller in the determined output mode.

The determination of a vehicle drive mode may include determining, by the controller, the vehicle drive mode by receiving the vehicle drive mode detected by a vehicle controller. The vehicle drive mode detected by the vehicle controller may include an electric vehicle mode, a deceleration mode, an idle mode, a partial load mode, a maximum load mode, and a series mode. The controller may be configured to determine the vehicle driving condition by separating a drive, a coasting deceleration, and a regenerative braking deceleration when the vehicle drive mode transmitted from the vehicle controller to the controller is the electric vehicle mode.

The determination of an output mode may include utilizing condition information of a vehicle such as motor output alteration applying hysteresis by the controller when the vehicle drive mode transmitted from the vehicle controller to the controller is the electric vehicle mode. In addition, the determination of an output mode may include determining the output mode of the low voltage converter as a first output mode when the vehicle drive mode is the electric vehicle mode, the vehicle driving condition is the drive, and the gear mode is a drive mode. The output mode may further be determined to be a first output mode when the vehicle drive mode is the electric vehicle mode, the vehicle driving condition is the coasting deceleration, and the gear mode is a drive mode.

Further, the step of determination an output mode may include determining the output mode of the low voltage converter as a second output mode when the vehicle drive mode is the electric vehicle mode, the vehicle driving condition is the regenerative braking deceleration, and the gear mode is a drive mode. The controller may be configured to determine the vehicle driving condition by separating a coasting deceleration and a regenerative braking deceleration when the vehicle drive mode transmitted from the vehicle controller to the controller is the deceleration mode.

The determination of an output mode may include utilizing condition information of a vehicle such as motor output alteration applying hysteresis by the controller when the vehicle drive mode transmitted from the vehicle controller to the controller is the deceleration mode. The output mode may be determined to be a first output mode when the vehicle drive mode is the deceleration mode, the vehicle driving condition is the coasting deceleration, and the gear mode is a drive mode. In addition, the output mode may be determined to be a second output mode when the vehicle drive mode is the deceleration mode, the vehicle driving condition is the regenerative braking deceleration, and the gear mode is a drive mode.

The output mode may further be determined to be a first output mode when the vehicle drive mode is the idle mode. The controller may be configured to determine a vehicle driving condition by separating an engine charging and a motor assistance when the vehicle drive mode transmitted from the vehicle controller to the controller is the partial load mode. The determination of an output mode may further include utilizing condition information of a vehicle such as motor output alteration applying hysteresis by the controller when the vehicle drive mode transmitted from the vehicle controller to the controller is the partial load mode.

Furthermore, the determination of an output mode may include determining the output mode of the low voltage converter to be a third output mode when the vehicle drive mode is the partial load mode, the vehicle driving condition is the engine charging, and the gear mode is a drive mode. The output mode may also be determined as a first output mode when the vehicle drive mode is the partial load mode, the vehicle driving condition is the motor assistance, and the gear mode is a drive mode. Additionally, the output mode may be determined to be a first output mode when the vehicle drive mode is the maximum load mode. The output mode may be determined to be a first output mode when the vehicle drive mode is the series mode.

A low voltage converter control system for a hybrid vehicle according to the present invention may include: a low voltage converter configured to convert high voltage to low voltage; a vehicle controller configured to detect a vehicle drive mode; and a controller of low voltage converter configured to determine an output mode of the low voltage converter based on the drive mode, a driving condition of a vehicle and a vehicle condition information detected by the vehicle controller, and adjust an output voltage of the low voltage converter using temperature and SOC of a battery in the determined output mode.

The control method of a low voltage DC-DC converter for a hybrid vehicle according to the present invention may derive effects as follows.

Firstly, unnecessary mode transition problem may be solved in a process of determining a drive mode by a low voltage converter controller as contrasted with a conventional art.

Secondly, control robustness may be ensured by separating hysteresis with respect to motor power input to optimize and use it when determining each drive mode.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The exemplary embodiments of the present invention will be described below with reference to the accompanying drawings.

Figure 1:
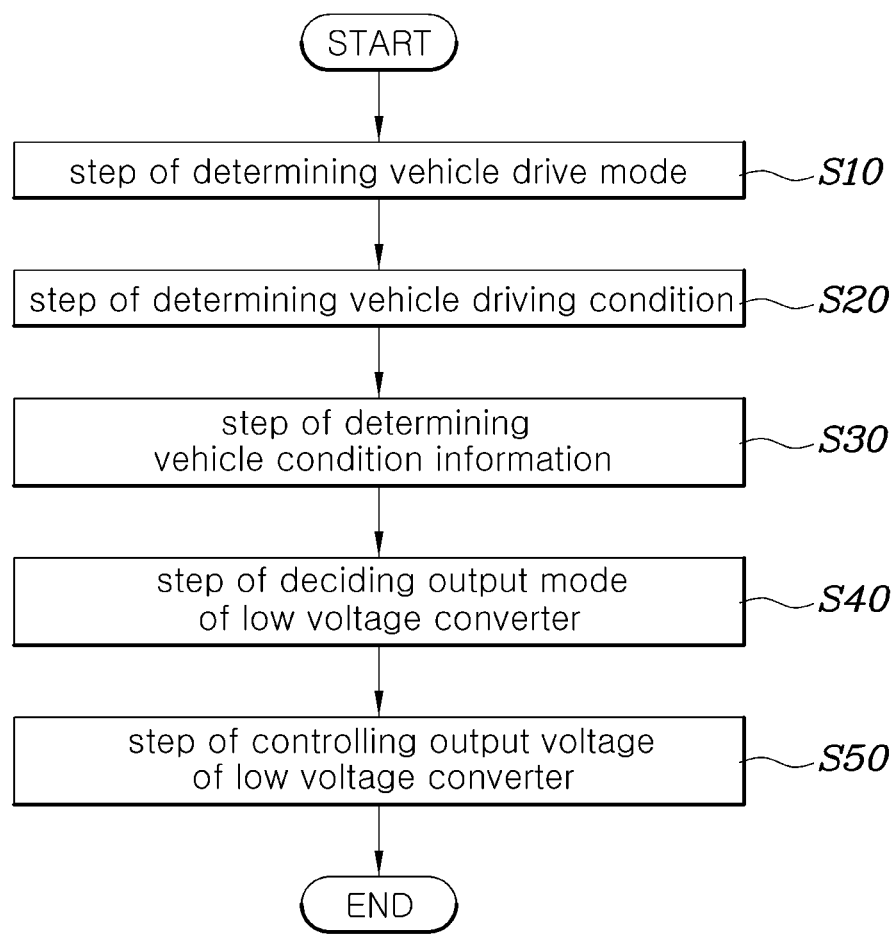
FIG. 1 is a flow chart of a control method of a low voltage DC-DC converter for a hybrid vehicle according to an exemplary embodiment of the present invention.
Figure 2:
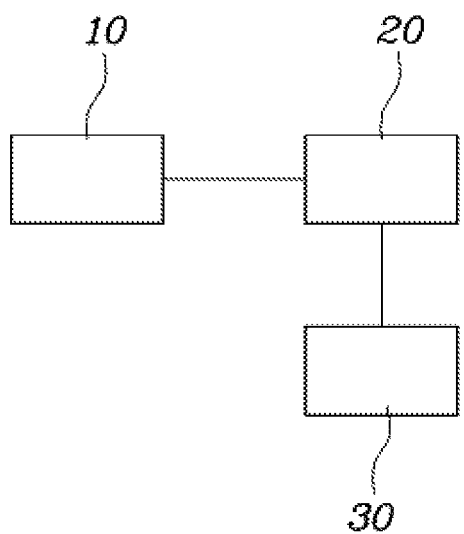
FIG. 2 is a drawing showing a control system of a low voltage converter for a hybrid vehicle according to an exemplary embodiment of the present invention.

A control method of a low voltage converter 10 for a hybrid vehicle according to the present invention may include determining a vehicle drive mode by a controller 20 of the low voltage converter 10 (S10); determining a vehicle driving condition by the controller 20 (S20); determining vehicle condition information including a motor output alteration and a gear mode by the controller 20 (S30); determining an output mode of the low voltage converter 10 by the controller 20 using the drive mode, the driving condition, and the condition information (S40); and adjusting an output voltage of the low voltage converter 10 using temperature and SOC of a battery in the determined output mode by the controller 20 (S50) as shown in FIG. 1.

In the determination of a vehicle drive mode (S10), the controller 20 may be configured to receive vehicle drive modes detected by a vehicle controller 30 to determine a vehicle drive mode. Herein, the vehicle controller 30, which may be a controller configured to execute global operation for vehicle driving, may be a higher controller in comparison with the controller 20 (e.g., a subordinate controller) of the low voltage converter 10. The vehicle drive modes detected from the vehicle controller 30 may vary based on conditions and type of a vehicle. The vehicle drive modes according to an exemplary embodiment of the present invention may include an electric vehicle mode, a deceleration mode, an idle mode, a partial load mode, a maximum load mode, and a series mode.

The electric vehicle mode indicates a mode in which a hybrid vehicle is driven by using a battery without driving an engine. In the deceleration mode, speed is reduced and in the idle mode, an engine is not driven. Additionally, in the partial load mode, load transmitted to a vehicle by vehicle driving is not maximum in the maximum load mode, load transmitted to a vehicle is maximum, and the series mode indicates when a hybrid vehicle is a series mode among a parallel mode and a series mode.

The controller 20 may be configured to detect a vehicle driving condition after the vehicle drive mode is determined to as mode among the above mentioned plurality of modes. The controller 20 may further be configured to determine a vehicle driving condition by separating a drive, a coasting deceleration, and a regenerative braking deceleration when the vehicle drive mode transmitted from the vehicle controller 30 to the controller 20 is the electric vehicle mode. In addition, the detection of the output mode may include considering condition information of a vehicle including motor output alteration applying hysteresis by the controller 20 when the vehicle drive mode transmitted from the vehicle controller 30 to the controller 20 is the electric vehicle mode. The hysteresis may be used to determine the regenerative braking deceleration and may be realized using one-dimension map data based on a vehicle speed. In particular, in the hysteresis, an output value may be 1 during the regenerative braking deceleration and an output value may be 0 not during the regenerative braking deceleration.

After the vehicle drive mode and the driving condition are determined, the output mode of the low voltage converter 10 may be determined based on the gear mode. According to the present invention, the output mode of the low voltage converter 10 may be determined to be a first output mode when the vehicle drive mode is the electric vehicle mode, the vehicle driving condition is the drive, and the gear mode is the drive mode. Additionally, the output mode of the low voltage converter 10 may be determined to be a first output mode when the vehicle drive mode is the electric vehicle mode, the vehicle driving condition is the coasting deceleration, and the gear mode is the drive mode. Further, the output mode of the low voltage converter 10 may be determined to be a second output mode when the vehicle drive mode is the electric vehicle mode, the vehicle driving condition is the regenerative braking deceleration, and the gear mode is the drive mode. The first output mode and the second output mode may have different output voltages of the low voltage converter 10, and generally, the output voltage of the first output mode may be an output voltage of an EV mode and the output voltage of the second output mode may be an output voltage of a regeneration mode.

Moreover, the controller 20 may be configured to determine the vehicle driving condition by separating the coasting deceleration and the regenerative braking deceleration (e.g., considering the decelerations separately) when the vehicle drive mode transmitted from the vehicle controller 30 to the controller 20 is the deceleration mode. In particularly, the determination of the output mode may include considering condition information of a vehicle including motor output alteration applying hysteresis by the controller 20 to be same with the above mentioned method.

In addition, the output mode of the low voltage converter 10 may be determined to be a first output mode when the vehicle drive mode is the deceleration mode, the vehicle driving condition is the coasting deceleration, and the gear mode is the drive mode, and the output mode of the low voltage converter 10 may be determined to be a second output mode when the vehicle drive mode is the deceleration mode, the vehicle driving condition is the regenerative braking deceleration, and the gear mode is the drive mode. The output mode of the low voltage converter 10 may further be determined to be a first output mode regardless of vehicle driving condition when the vehicle drive mode is the idle mode.

Moreover, the controller 20 may be configured to determine a vehicle driving condition by separating an engine charging and a motor assistance when the vehicle drive mode transmitted from the vehicle controller 30 to the controller 20 is the partial load mode. In particular, the hysteresis may be applied to motor output alteration similar to the above mentioned electric vehicle mode. The hysteresis may be used to determine motor assistance and may be deduced through a map data having a vehicle speed as input and a motor output variation as output. In addition, an output value may be 1 in response to determining that the motor assistance is operating and an output value may be 0 in response to determining that the motor assistance is not operating.

The output mode of the low voltage converter 10 may be determined to be a third output mode when the vehicle drive mode is the partial load mode, the vehicle driving condition is the engine charging, and the gear mode is the drive mode, and the output mode of the low voltage converter 10 may be determined to be a first output mode when the vehicle drive mode is the partial load mode, the vehicle driving condition is the motor assistance, and the gear mode is the drive mode. The first output mode may indicate the output voltage in the above mentioned EV mode and the third output mode as charging voltage in the engine charging mode may be a charging mode of a vehicle based on that a vehicle driving state is in an engine charging state.

Furthermore, the output mode of the low voltage converter 10 may be determined without separating the driving condition when the vehicle drive mode is the maximum load mode and the series mode. According to the present invention, the output mode of the low voltage converter 10 may be determined to be a first output mode when the vehicle drive mode is the maximum load mode and the output mode of the low voltage converter 10 may be determined to be a first output mode when the vehicle drive mode is the series mode, too.

In addition, a low voltage converter control system for a hybrid vehicle according to the present invention may include a low voltage converter 10 configured to convert high voltage to low voltage; a vehicle controller 30 configured to detect a vehicle drive mode; and a controller 20 configured to determine an output mode of the low voltage converter 10 using a drive mode, driving conditions of a vehicle and vehicle conditions information detected by the vehicle controller 30, and adjusting an output voltage of the low voltage converter 10 using temperature and SOC of a battery in the determined output mode.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method of a low voltage direct current-direct current (DC-DC) converter for a hybrid vehicle, comprising:
   determining, by a controller of a low voltage converter, a vehicle drive mode;
   determining, by the controller, vehicle driving condition;
   determining, by the controller, vehicle condition information including a motor output alteration and a gear mode;
   determining, by the controller, an output mode of the low voltage converter based on the drive mode, the driving condition, and the condition information; and
   adjusting, by the controller, an output voltage of the low voltage converter based on temperature and state of charge (SOC) of a battery in the determined output mode.

2. The control method of claim 1, wherein the determination of a vehicle drive mode includes determining, by the controller, the vehicle drive mode by receiving the vehicle drive mode detected by a vehicle controller.

3. The control method of claim 2, wherein the detected vehicle drive mode detected includes an electric vehicle mode, a deceleration mode, an idle mode, a partial load mode, a maximum load mode, and a series mode.

4. The control method of claim 3, wherein the controller is configured to determine the vehicle driving condition by separating a drive, a coasting deceleration, and a regenerative braking deceleration when the vehicle drive mode transmitted from the vehicle controller to the controller is the electric vehicle mode.

5. The control method of claim 3, wherein the determination of an output mode is based on condition information of a vehicle including motor output alteration applying hysteresis by the controller when the vehicle drive mode transmitted from the vehicle controller to the controller is the electric vehicle mode.

6. The control method of claim 4, wherein the determination of an output mode includes determining the output mode of the low voltage converter to be a first output mode when the vehicle drive mode is the electric vehicle mode, the vehicle driving condition is the drive, and the gear mode is a drive mode.

7. The control method of claim 4, wherein the determination of an output mode includes determining the output mode of the low voltage converter to be a first output mode when the vehicle drive mode is the electric vehicle mode, the vehicle driving condition is the coasting deceleration, and the gear mode is a drive mode.

8. The control method of claim 4, wherein the determination of an output mode includes determining the output mode of the low voltage converter to be a second output mode when the vehicle drive mode is the electric vehicle mode, the vehicle driving condition is the regenerative braking deceleration, and the gear mode is a drive mode.

9. The control method of claim 3, wherein the controller is configured to determine the vehicle driving condition by separating a coasting deceleration and a regenerative braking deceleration in a case that the vehicle drive mode transmitted from the vehicle controller to the controller is the deceleration mode.

10. The control method of claim 3, wherein the step of deciding an output mode uses condition information of a vehicle including motor output alteration applying hysteresis by the controller in a case that the vehicle drive mode transmitted from the vehicle controller to the controller is the deceleration mode.

11. The control method of claim 9, wherein the step of deciding an output mode decides the output mode of the low voltage converter to a first output mode in a case that the vehicle drive mode is the deceleration mode, the vehicle driving condition is the coasting deceleration, and the gear mode is a drive mode.

12. The control method of claim 9, wherein the step of deciding an output mode decides the output mode of the low voltage converter to a second output mode in a case that the vehicle drive mode is the deceleration mode, the vehicle driving condition is the regenerative braking deceleration, and the gear mode is a drive mode.

13. The control method of claim 3, wherein the step of deciding an output mode decides the output mode of the low voltage converter to a first output mode in a case that the vehicle drive mode is the idle mode.

14. The control method of claim 3, wherein the controller determines a vehicle driving condition by separating an engine charging and a motor assistance in a case that the vehicle drive mode transmitted from the vehicle controller to the controller is the partial load mode.

15. The control method of claim 3, wherein the step of deciding an output mode uses condition information of a vehicle including motor output alteration applying hysteresis by the controller in a case that the vehicle drive mode transmitted from the vehicle controller to the controller is the partial load mode.

16. The control method of claim 14, wherein the determination of an output mode includes determining the output mode of the low voltage converter to be a third output mode when the vehicle drive mode is the partial load mode, the vehicle driving condition is the engine charging, and the gear mode is a drive mode.

17. The control method of claim 14, wherein the determination of an output mode includes determining the output mode of the low voltage converter to be a first output mode when the vehicle drive mode is the partial load mode, the vehicle driving condition is the motor assistance, and the gear mode is a drive mode.

18. The control method of claim 3, wherein the determination of an output mode includes determining the output mode of the low voltage converter to be a first output mode when the vehicle drive mode is the maximum load mode.

19. The control method of claim 3, wherein the determination of an output mode includes determining the output mode of the low voltage converter to be a first output mode when the vehicle drive mode is the series mode.

20. A low voltage converter control system for a hybrid vehicle, comprising:
   a low voltage converter configured to convert high voltage to low voltage;
   a vehicle controller configured to detect a vehicle drive mode; and
   a controller of low voltage converter configured to determine an output mode of the low voltage converter using the drive mode, a driving condition of a vehicle and a vehicle condition information detected by the vehicle controller, and adjust an output voltage of the low voltage converter using temperature and state of charge (SOC) of a battery in the determined output mode.

* * * * *